(12) United States Patent
Kollin et al.

(10) Patent No.: US 6,700,552 B2
(45) Date of Patent: Mar. 2, 2004

(54) SCANNING DISPLAY WITH EXPANDED EXIT PUPIL

(75) Inventors: Joel S. Kollin, Seattle, WA (US); Richard S. Johnston, Issaquah, WA (US); Charles D. Melville, Issaquah, WA (US)

(73) Assignee: University of Washington, Seattle, WA (US)

( * ) Notice: Subject to any disclaimer, the term of this patent is extended or adjusted under 35 U.S.C. 154(b) by 516 days.

(21) Appl. No.: 09/728,847

(22) Filed: Dec. 1, 2000

(65) Prior Publication Data

US 2001/0000124 A1 Apr. 5, 2001

Related U.S. Application Data

(63) Continuation of application No. 08/975,259, filed on Nov. 20, 1997, now Pat. No. 6,157,352, which is a continuation of application No. 08/624,950, filed on Mar. 29, 1996, now Pat. No. 5,701,132.

(51) Int. Cl.[7] ................................................. G09G 5/00
(52) U.S. Cl. .............................. 345/7; 359/13; 359/630
(58) Field of Search .......................... 345/8, 7; 359/630, 359/631, 632, 633, 13, 14

(56) References Cited

U.S. PATENT DOCUMENTS

| 5,164,848 A | * | 11/1992 | Firth et al. ..................... 359/13 |
| 5,473,403 A | * | 12/1995 | Suda et al. ..................... 396/121 |
| 5,587,836 A | * | 12/1996 | Takahashi et al. .......... 359/630 |
| 5,742,262 A | * | 4/1998 | Tabata et al. ................... 345/8 |

* cited by examiner

Primary Examiner—Kent Chang
(74) Attorney, Agent, or Firm—Steven P. Koda

(57) ABSTRACT

A display device is achieved using a simplified optical system which generates an expanded exit pupil without compromising magnification or resolution. Modulated light from a source is converged toward a focal point by an optics subsystem. A scanning subsystem deflects the converging light, and thus the focal point, along a raster pattern to define a curved intermediate image plane. An exit pupil expanding apparatus defines a curved surface which coincides with the curved image plane. Impinging light rays at a given instant in time span a given incidence angle. Exiting light rays span a larger angle. As a result, the exiting light spans a larger surface area of an ensuing eyepiece. In turn an expanded exit pupil occurs beyond the eyepiece. Embodiments of the expanding apparatus include a curved diffractive optical element, fiber optic face plate, lens array and diffuser. The diffractive optical element generates multiple exit pupils, while the other embodiments generate enlarged exit pupils.

9 Claims, 6 Drawing Sheets

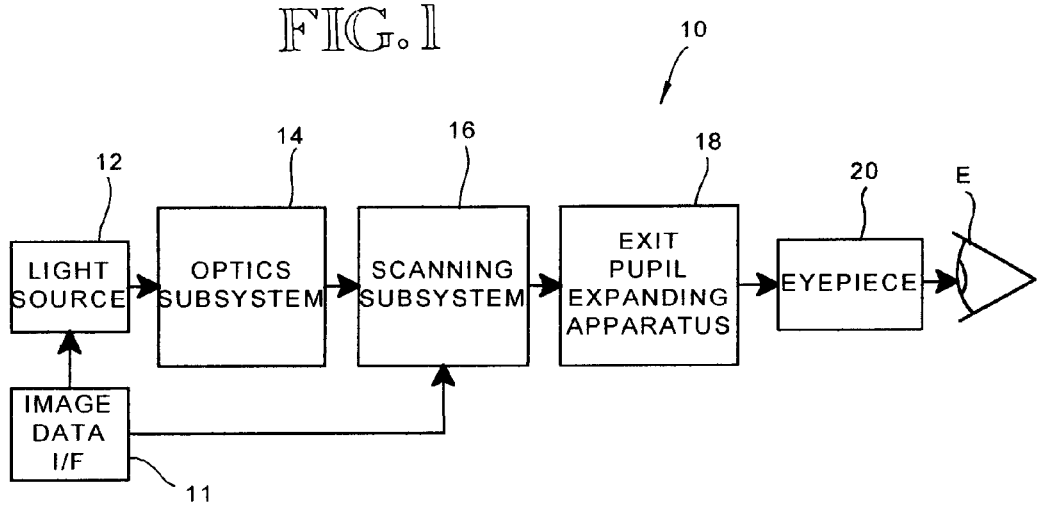
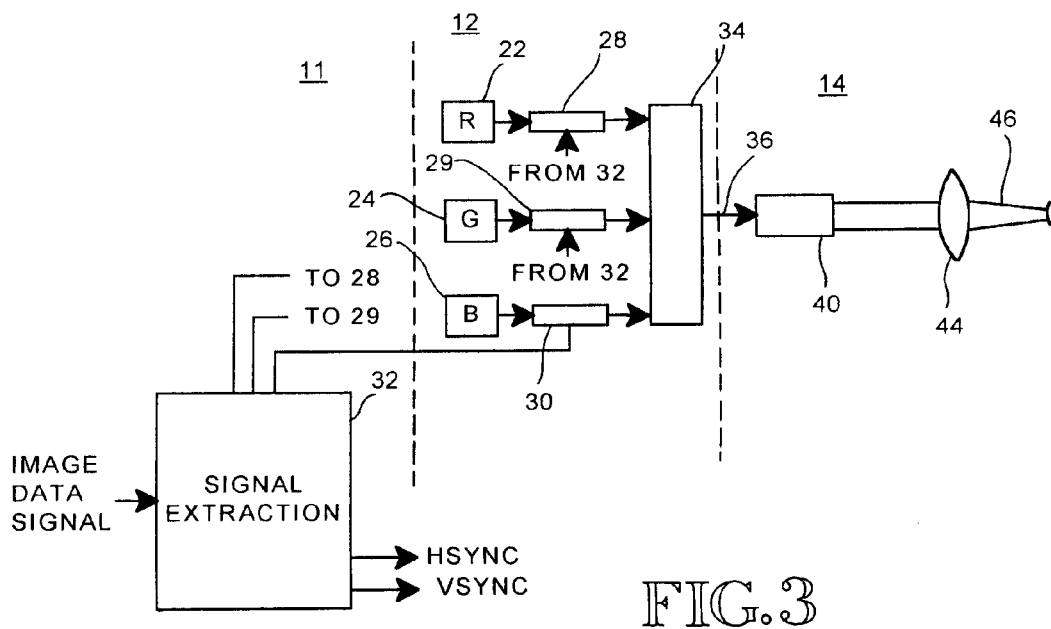

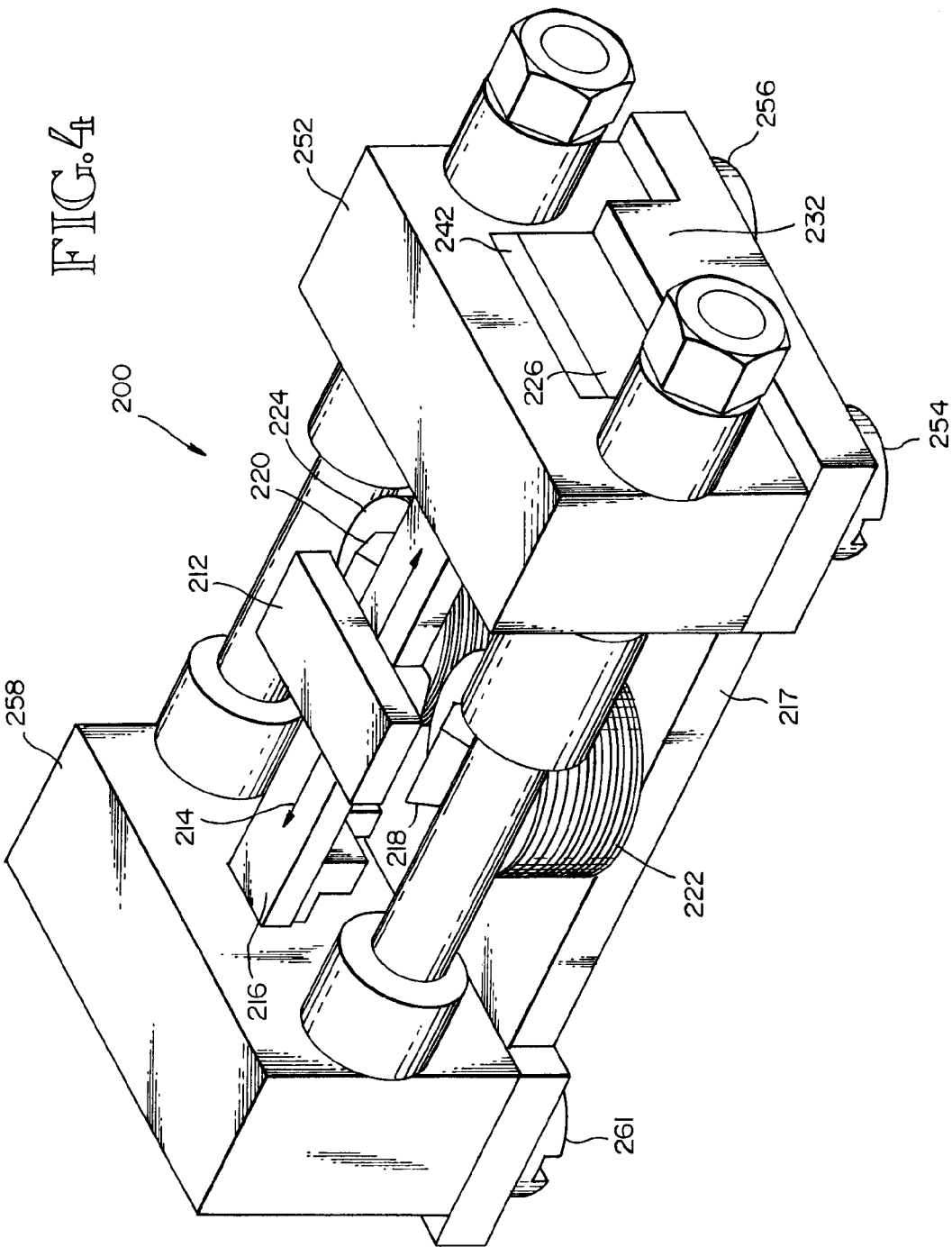

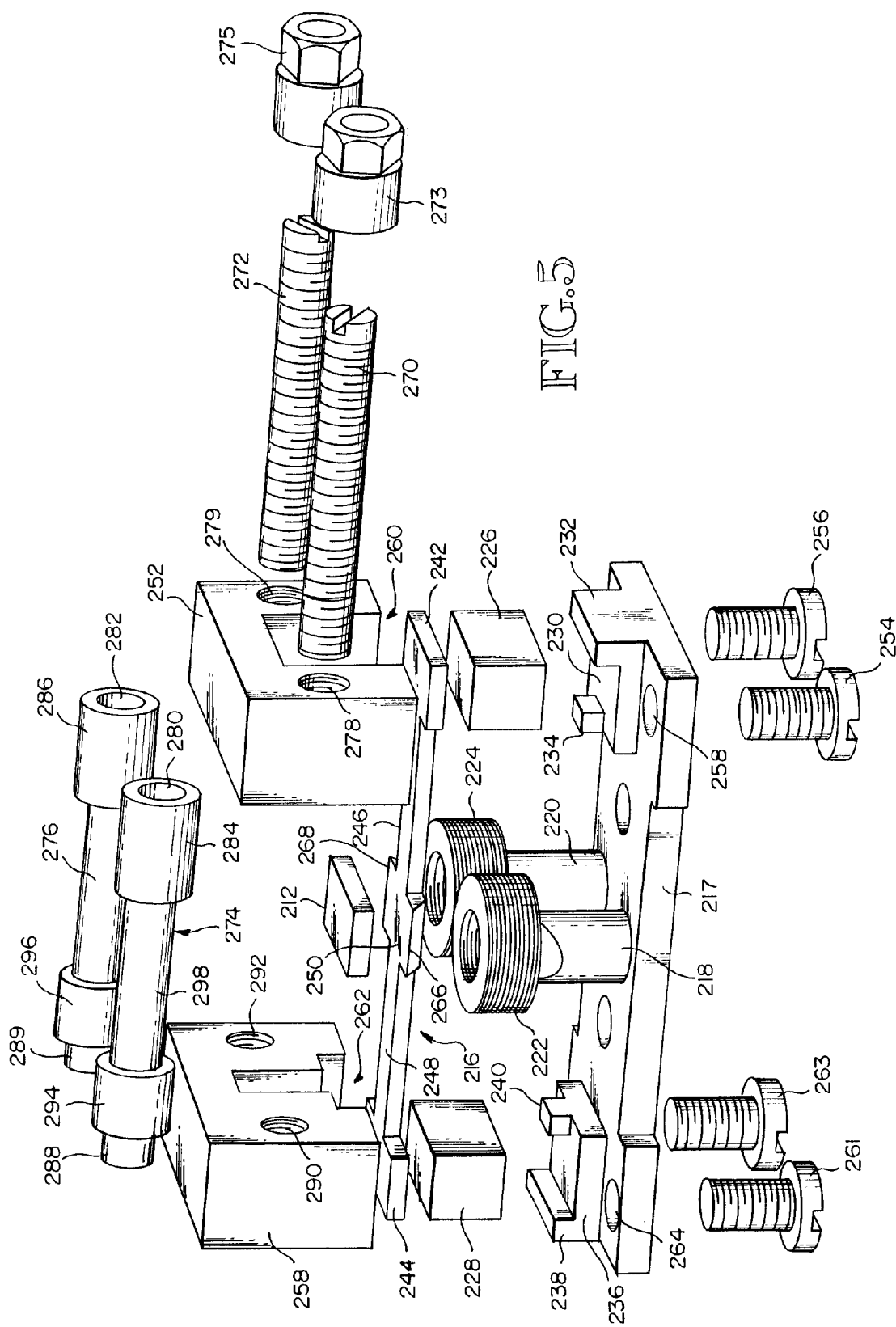

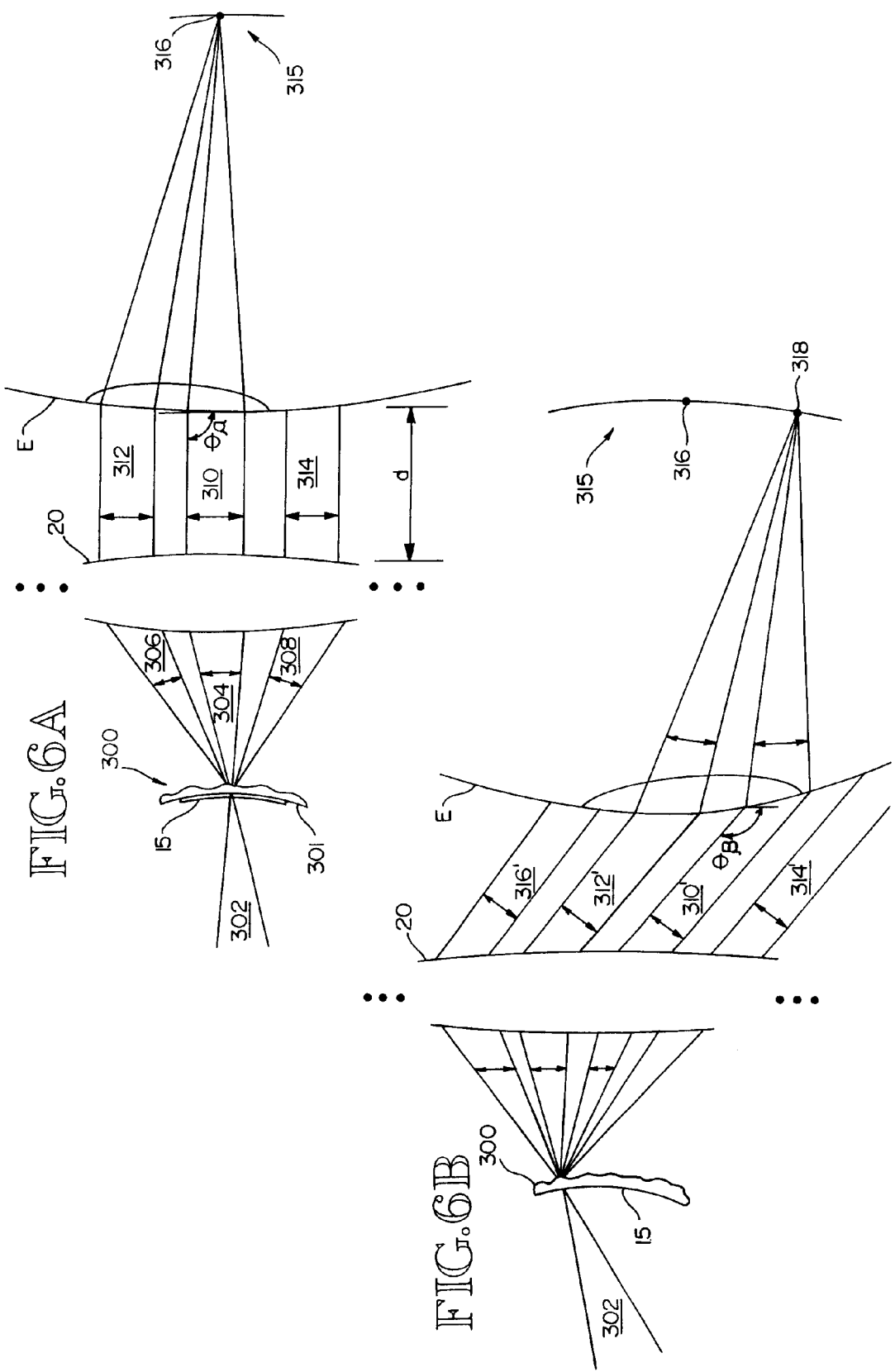

SCANNING DISPLAY WITH EXPANDED EXIT PUPIL

CROSS REFERENCE TO RELATED APPLICATION

This is a continuation of U.S. patent application Ser. No. 08/975,259 filed Nov. 20, 1997 for "Virtual Retinal Display with Expanded Exit Pupil," now U.S. Pat. No. 6,157,352 which is a continuation of U.S. Pat. No. 5,701,132 issued Dec. 23, 1997 on application Ser. No. 08/624,950 filed Mar. 29, 1996 for "Virtual Retinal Display with Expanded Exit Pupil." The content of such patent and patent application are incorporated herein by reference and made a part hereof.

BACKGROUND OF THE INVENTION

This invention relates to retinal display devices, and more particularly to optical configurations for retinal display devices and a method and apparatus for defining an exit pupil through which a user views an image.

A retinal display device is an optical device for generating an image upon the retina of an eye. Conventional retinal scanning displays use a coherent light source which is scanned in raster fashion onto the retina. Light is emitted from a light source, collimated through a lens, then passed through a scanning device. The scanning device defines a scanning pattern for the light. Following the scanning device, the scanned light passes through an objective lens which converges the light to focus an image. Conventionally such light is converged to a flat image plane. The light then diverges beyond the plane. An eyepiece is positioned along the light path beyond the objective lens at some desired focal length. An "exit pupil" (i.e., area of generated light pattern) occurs shortly beyond the eyepiece in an area where a viewer's eye pupil is to be positioned.

A viewer looks into the eye piece to view an image. The eye piece receives light that is being deflected along a raster pattern. Light thus impinges on the viewer's eye pupil at differing angles at different times during the scanning cycle. This range of angles determines the size of the image perceived by the viewer. Modulation of the light during the scanning cycle determines the content of the image.

Typically the exit pupil defined by the display device is less than 2 mm in diameter and often less than 1 mm in diameter. The viewer's eye pupil varies from approximately 2 mm in diameter under bright light to approximately 7 mm in a dark room. Because of the small exit pupil, a first step for a viewer is to adjust eye position to find the exit pupil. The viewer's pupil needs to achieve and maintain alignment with the display device's exit pupil. While in alignment, the light scans directly onto the viewer's retina without any intermediary screens, cathode ray tubes (CRT's) or liquid crystal display devices (LCD's). The result is an image perceived by the viewer.

A shortcoming of the conventional retinal display is the difficulty of maintaining alignment between the exit pupil and the viewer's pupil. If the viewer moves, alignment may be lost. Movement is problematic because a viewer has a tendency to move their eye when intending to view a peripheral portion of the image. Even blinking may cause movement of the eye. As a result, conventional exit pupils are inconvenient for the viewer. In particular a lay consumer using a virtual retinal display would find the alignment requirement difficult to maintain for entertainment or other long term viewing applications. Accordingly there is a need for a retinal display device having an exit pupil defined so as to enable easier viewing of the image.

Other shortcomings of conventional retinal display devices include the display's size and weight. As the retinal display device is to be positioned in the vicinity of a viewer's eye, there is a need to achieve a lightweight compact display device.

SUMMARY OF THE INVENTION

According to the invention, a lightweight, compact retinal display device is achieved using a simplified optical system which generates an expanded exit pupil without compromising magnification or resolution.

According to one aspect of the invention, a scanning device for deflecting light is located along the light path following an objective lens system. Significantly, the retinal display device of this invention avoids use of an objective lens system following the scanning device. The elimination of an objective lens system beyond the scanner shortens the light path through the retinal display device. One advantage of such a configuration is a lighter, more compact display device.

In a post-objective scanning system the scanning device receives converging light. Beyond the scanning device, the light continues to converge to an intermediate image plane. According to another aspect of this invention, the image plane is an intermediate curved image plane. The light then diverges beyond this plane in the direction of an eyepiece.

According to another aspect of the invention, an apparatus for expanding the exit pupil is positioned between the scanning device and the eyepiece at the curved image plane. To achieve a focused image with maximum resolution, the exit pupil expanding apparatus defines a curved surface which coincides with the intermediate curved image plane. The apparatus is positioned at the intermediate curved image plane so as to maintain maximum resolution and focus.

One advantage of this invention is that the shorter light path enabled by avoiding an objective after the scanning device allows for a more compact, lighter weight retinal display device. Another advantage is that a viewer has less difficulty aligning and maintaining alignment with an exit pupil formed at the eyepiece. In particular, the expanded exit pupil, the multiple exit pupils or the multiple expanded exit pupils make it easier for a viewer to align with an exit pupil. Another advantage with regard to the diffractive optical element embodiment is that image brightness is generally uniform among various groups of exit pupils which may form at the viewer's eye. These and other aspects and advantages of the invention will be better understood by reference to the following detailed description taken in conjunction with the accompanying drawings.

BRIEF DESCRIPTION OF THE DRAWINGS

FIG. 1 is a block diagram of a virtual retinal display according to an embodiment of this invention;

FIG. 3 is a block diagram of the image data interface, light source, and optics subsystem of FIG. 1 according to an embodiment of this invention;

FIG. 4 is a perspective drawing of the scanning subsystem of FIG. 1 according to an embodiment of this invention;

FIG. 5 is an exploded view of the scanning subsystem of FIG. 4;

FIG. 6 is an optical diagram of the exit pupil expanding apparatus according to one embodiment of this invention;

DESCRIPTION OF SPECIFIC EMBODIMENTS

Overview

Figure 2:
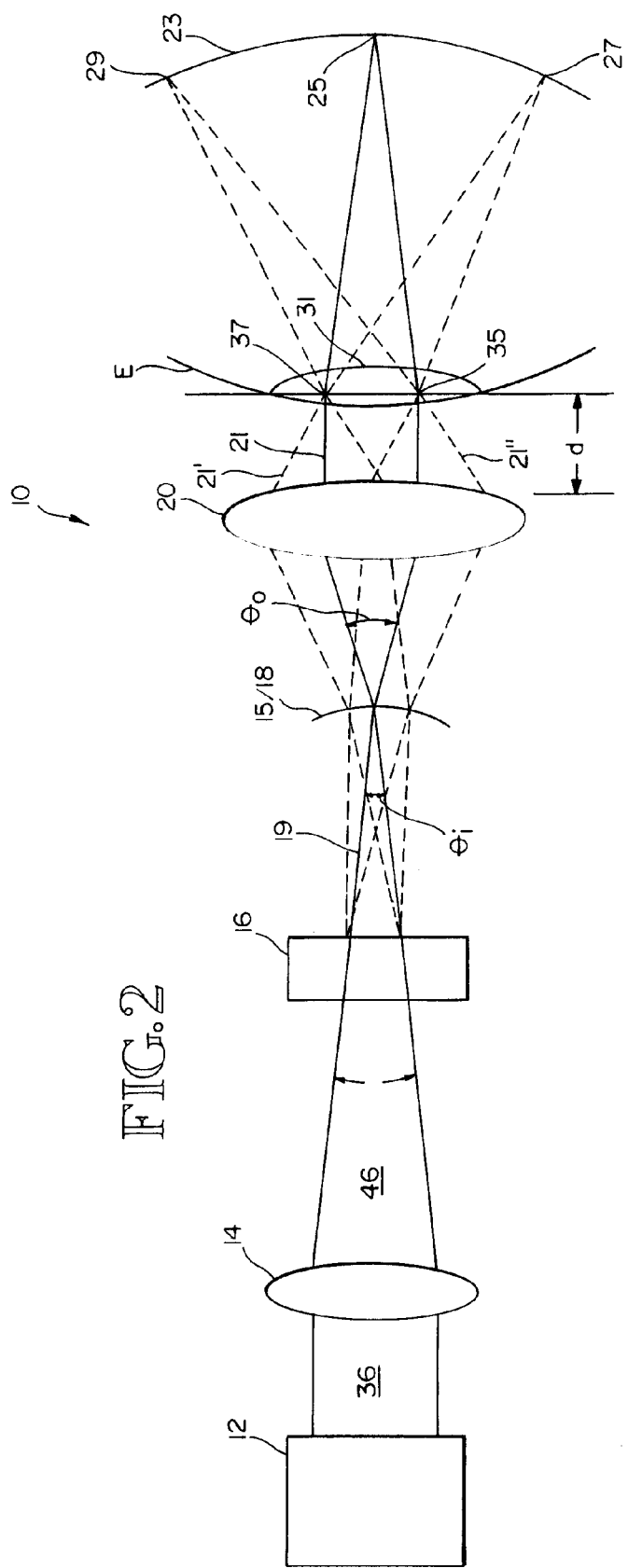
FIG. 2 is an optical schematic of the virtual retinal display of FIG. 1.

In one embodiment the exit pupil expanding apparatus is formed by a diffractive optical element. The diffractive optical element has a curved surface receiving light from the scanning device. Such curved surface coincides with the intermediate curved image plane scanned by the scanning device. The diffractive optical element replicates the incident light beams to produce multiple exit light beams. More specifically, the diffractive optical element passes one fraction of received light in the same direction as the incident light. Additional beams are passed at specific angles relative to the incident light. The percentage of light in each beam leaving the diffractive optical element is determined by the diffraction pattern. The angle spanned by each exiting light beam is defined by spacing among diffraction patterns and the light wavelengths. The cumulative angle of light beams exiting the diffractive optical element spans an angle greater than the cumulative angle of light beams incident to the diffractive optical element. Each exiting light beam output from the diffractive optical element passes through the eyepiece to define a separate exit pupil. In effect multiple closely spaced exit pupils are defined beyond the eyepiece in an area to coincide with a viewer's eye. One or more of such exit pupils of substantially the same size occur at the viewer's eye pupil. If a viewer moves their eye, the viewer's eye moves into alignment with other exit pupils. Also, by forming multiple exit pupils, the average brightness of the group of exit pupils formed within the viewer's eye at any given time stays approximately the same. When the viewer moves their eye to align with a newly defined group of exit pupils, the average brightness remains approximately the same as with the previous group of exit pupils.

In another embodiment the exit pupil expanding apparatus is formed by a bundle of aligned optical fibers, (e.g., a fiber optic face plate). One end of each fiber defines a portion of the curved plane which receives the light from the scanning device. Light enters a fiber over a given narrow angle, then exits over an enlarged angle. By creating an exit angle greater than the incident angle the exiting light impinges upon a larger surface of the ensuing eyepiece. The eye piece in turn passes light over an expanded exit pupil. According to variations, to best match the geometry of the eyepiece the fiber bundle defines at its exit surface either one of a flat planar surface or curved planar surface.

In another embodiment the exit pupil expanding apparatus is formed by a lens array. The lens array includes several small lenses in which each lens has a diameter on the order of 5–100 microns. Each lens is spaced as closely as possible to each adjacent lens in the array. The array defines a curved plane from sides of each lens facing the scanning device. Such curved plane receives the light from the scanning device. Light enters each lens over a given narrow angle, then exits over an enlarged angle. By creating an exit angle greater than the incident angle the exiting light impinges upon a larger surface of the ensuing eyepiece. As in the fiber bundle embodiment, the eyepiece in turn passes light over an expanded exit pupil.

In another embodiment the exit pupil expanding apparatus is formed by a diffuser. The diffuser defines a curved surface corresponding to the intermediate curved image plane. The diffuser evenly spreads the passing light. The light output from the diffuser spans a greater angle than the light incident to the diffuser. Thus, the light output from the diffuser is an expanded beam which passes through the eyepiece to define an expanded exit pupil.

In some embodiments the exit pupil expanding apparatus reflect light. The reflected light is used to form the expanded exit pupil(s).

FIG. 1 shows a block diagram of a virtual retinal display 10 according to one embodiment of this invention. The display 10 receives image data from a computer device, video device or other digital or analog image data source. Light generated by the display 10 is altered according to the image data to scan an image into the retina of a viewer's eye E.

The retinal display 10 generates and manipulates light to create color or monochrome images having narrow to panoramic fields of view and low to high resolutions. The display 10 does not generate a "real image" as done by CRTs, LCDs or an LED array. Instead, light modulated with video information is scanned directly onto the retina of a viewer's eye E to produce the perception of an erect virtual image. Because a real image is neither generated nor portrayed on a screen, the retinal display is small in size. In particular, the retinal display is suitable for hand-held operation or for mounting on the viewer's head.

The retinal display 10 includes an image data interface 11, a light source 12, an optics subsystem 14, a scanning subsystem 16, an exit pupil expanding apparatus 18, and an eyepiece 20. The image data interface 11 receives a video or other image signal, such as an RGB signal, NTSC signal, VGA signal or other formatted color or monochrome video or image data signal. The light source 12 includes one or more sources of light. In one embodiment red, green and blue light sources are included. The light sources or their output beams are modulated according to the input image data signal content to produce light which is input to an optics subsystem 14. In one embodiment the emitted light is coherent. In another embodiment the emitted light is noncoherent.

Referring to FIG. 2, the optics subsystem 14 serves as an objective to focus the light. For some embodiments in which noncoherent light is received, the optics subsystem 14 also collects the light. The light exiting the optics subsystem 14 converges toward a focal point at image plane 15. Prior to the image plane 15 is the scanning subsystem 16. The scanning subsystem 16 deflects the light and the ensuing focal point to define an image plane of focal points. Typically the light is deflected along a raster pattern, although other display formats such as vector imaging also can be used. In one embodiment the scanning subsystem 16 receives a horizontal deflection signal and a vertical deflection signal derived from the image data interface 11. In another embodiment, the scanning subsystem includes a mechanical resonator for deflecting passing light. FIG. 2 shows deflection of light 19 along one axis. As the light 19 is deflected, the focal point moves. Over the course of scanning a raster pattern the focal points define the intermediate curved image plane 15.

The exit pupil expanding apparatus 18 is positioned at the location where the intermediate curved image plane 15 is to occur. Specifically the exit pupil expanding apparatus 18 has a curved surface upon which light 19 impinges. Such curved surface coincides with the image plane 15. The light exiting the apparatus 18 exits over an angle qo which is larger than an angle qi of incident light. As a result the light exiting the apparatus 18 spreads over a larger surface area of the eyepiece 20. This, in turn, causes a larger exit pupil 21 to occur.

The exit pupil expanding apparatus 18 in various embodiments expands the exit pupil to define an enlarged exit pupil 21 by generating multiple closely spaced (or overlapping) exit pupils and/or by enlarging the exit pupil(s). A diffractive optical element embodiment generates multiple exit pupils. A fiber-optic face plate embodiment, lens array embodiment or diffuser embodiment enlarges a single exit pupil. The light output from the exit pupil expanding apparatus 18 travels to the eyepiece 20. The expanded exit pupil(s) occur slightly beyond the eyepiece 20 at a location where a viewer positions the pupil of their eye E.

FIG. 2 shows light paths for three pixels of an image to be formed on the eye E retina 23. Light impinging on the apparatus 18 results in formation of an exit pupil 21, 21', 21" at a distance d from the eyepiece 20. The part numbers 21, 21', 21" depict the exit pupil at respective points in time receiving light at differing respective angles. The light rays forming the exit pupil 21 for a given pixel impinge upon the eye's pupil 31 at a common angle. As a result, the light is focused to a point on the retina 23. Such point 25 corresponds in effect to a pixel of an image.

A short time after the imaging of point 25, the scanning subsystem 16 deflects light 19 to another focal point on the intermediate curved image plane 15. As a result, the exit pupil 21' occurs. Exit pupil 21' corresponds to exit pupil 21 and occurs at approximately the same 3-dimensional position relative to the eyepiece 20. This is evident from the common boundary points 33, 35 where the exit pupil 21, 21'forms at the eye pupil 31. Exit pupil 21' is formed by light rays impinging the eye pupil at a common angle. Such angle, however, differs from the angle of the light rays forming exit pupil 21. Due to the differing angle, the light rays forming exit pupil 21' focus at a different point 27 on the eye retina 23. Thus, by deflecting the light 19, the image point formed in the retina moves from point 25 to point 27.

FIG. 2 further depicts formation of another image point 29 at the retina 23. Such point 29 is formed as the scanning subsystem 16 deflects light 19 so as to change the current focal point location within the image plane 15. In turn the altered focal point causes light rays of a different angle to define an exit pupil 21". The light rays defining the exit pupil 21" impinge the eye pupil 31 at a common angle. Such common angle differs than that for exit pupils 21, 21'. The result is a different image point 29 formed on the eye retina 23. Thus, as the scanning subsystem deflects the light 19, the light rays forming the exit pupil 21 (21', 21")at different moments in time impinge upon the eye pupil 31 at differing angles. For each variation in angle the focal point on the retina varies. As the scanning subsystem 16 deflects light 19 along a raster pattern, a raster of focal points occurs on the retina. The raster of focal points defines an image scanned directly on the retina.

For the pixels described above, at a given time the light rays defining an exit pupil are said to impinge on the eye at a common angle. For such an embodiment the eyepiece 20 preferably is positioned at one focal distance from the intermediate curved image plane 15. In an alternative embodiment the relative distance between the image plane 15 and eyepiece is variable. In the case where the relative distance is slightly less than one focal length, the size and apparent depth of the image formed in the viewer's eye changes.

Light Source

The light source 12 includes a single or multiple light sources. For generating a monochrome image a single monochrome source typically is used. For color imaging, multiple light sources are used. Exemplary light sources are colored lasers, laser diodes or light emitting diodes (LEDs). Referring to FIG. 3, an embodiment having a respective red photon source 22, green photon source 24 and blue photon source 26 are shown, although other colors may be used.

Although LEDs do not output coherent light, lenses are used in one embodiment to shrink the apparent size of the LED light source and achieve flatter wave fronts. In a preferred LED embodiment a single mode monofilament optical fiber receives the LED output to define a point source which outputs light approximating coherent light.

Additional detail on these and other light source 12 embodiments are found in U.S. patent application Ser. No., 08/437,818 for "Virtual Retinal Display with Fiber Optic Point Source" filed May 9, 1995, and incorporated herein by reference.

According to alternative embodiments, the light sources or the light generated by the light sources are modulated to include red, green and or blue components at a given point (e.g., pixel) of a resulting image. Referring to FIG. 3 respective beams of light sources 22, 24, 26 are modulated to introduce color components at a given pixel. Red light from source 22 is output to a modulator 28 then to a beam combining apparatus 34. Green light from source 24 is output to a modulator 29 then to the beam combining apparatus 34. Lastly, blue light from source 26 is output to a modulator 30 then to the beam combining apparatus 34. The modulators 28, 29, 30 modulate the respective beams of light according to R, G and B component signals derived from the image data signal received into the display 10.

In one embodiment the beam combining apparatus 34 is formed by an arrangement of dichroic mirrors or dichroic beam splitters which direct a substantial portion of each beam into a common beam. The light output along such common path is light 36 which subsequently enters the optical subsystem 14.

Image Data Interface

The retinal display device 10 is an output device which receives image data to be displayed. Such image data is received as an image data signal at the image data interface 11. In various embodiments, the image data signal is a video or other image signal, such as an RGB signal, NTSC signal, VGA signal or other formatted color or monochrome video or graphics signal. Referring to FIG. 3, an exemplary embodiment of the image data interface 11 extracts color component signals and synchronization signals from the received image data signal. In an embodiment in which an image data signal has embedded red, green and blue components, the red signal is extracted and routed to the modulator 28 for modulating the red light source 22 output. Similarly, the green signal is extracted and routed to the modulator 29 for modulating the green light source 24 output. Also, the blue signal is extracted and routed to the modulator 30 for modulating the blue light source 26 output.

The image data signal interface 11 also extracts a horizontal synchronization component and vertical synchronization component from the image data signal. In one embodiment, such signals define respective frequencies for horizontal scanner and vertical scanner drive signals routed to the scanning subsystem 16.

Pre-Scanning Optics Subsystem

The optics subsystem 14 receives the output beam 36 from the beam combining apparatus 34 and converges the beam. Left undisturbed the beam converges to a focal point then diverges beyond such point. As the converging light is deflected, however, the focal point is deflected the pattern of deflection defines a pattern of focal points. Such pattern is referred to as an intermediate image plane. Referring to FIG. 2, such intermediate image plane 15 occurs as a curved image plane.

In an exemplary embodiment the optics subsystem 14 includes an objective lens 44 which converges the light 36 received from the light source 12. In an embodiment for a laser diode light source, the optic subsystem 14 includes a cylindrical lens 40 and an objective lens 44 (see FIG. 3). The cylindrical lens 40 equalizes the divergence angle of the light output from the laser diode sources. The objective lens 44 then converges the light toward the intermediate curved image plane 15—(see FIG. 2).

Post-Objective Scanning Subsystem

The scanning subsystem 16 receives the converging light output from the optics subsystem at a position prior to the curved image plane 15. In one embodiment the scanning subsystem 16 includes two resonant scanners 200. One scanner is for deflecting light along a horizontal axis. The other scanner is for deflecting light along a vertical axis. FIGS. 4 and 5 show a miniature optical resonant scanner 200. The function of the scanner 200 is to deflect light along a horizontal axis or a vertical axis. In one embodiment a pair of scanners 200 deflect light along a raster pattern so as to define the intermediate image plane 15. A scanner 200 serving as the horizontal scanner receives a drive signal having a frequency defined by the horizontal synchronization signal HSYNC extracted at the image data interface 11. Similarly, a scanner 200 serving as the vertical scanner receives a drive signal having a frequency defined by the vertical synchronization signal VSYNC extracted at the image data interface. Such drive signals tune a resonance circuit of the scanner 200.

Referring to FIG. 4 the scanner 200 includes a mirror 212 driven by a magnetic circuit so as to oscillate at a high frequency about an axis of rotation 214. In one embodiment the only moving parts are the mirror 212 and a spring plate 216. The optical scanner 200 also includes a base plate 217 with a pair of stator posts 218, 220 centrally located thereon. The base plate 217 and stator posts 218, 220 are integrally formed in one piece of a soft iron. Stator coils 222 and 224 are wound in opposite directions about the respective stator posts 218 and 220. The electrical coil windings 222 and 224 may be connected in series or in parallel to a drive circuit as discussed below. Mounted on opposite ends of the base plate 217 are first and second magnets 226 and 228, the magnets 226, 228 being equidistant from the stators 218 and 220. In order to locate the magnet 226, the base 217 is formed with a seat 230 having a back stop 232 extending up from one end of the seat 230 and having a front stop 234 extending up from the seat at the opposite end thereof. Similarly, to locate the magnet 228, the base 217 is formed with a seat 236 at the end of the base opposite the seat 230. The seat 236 includes a back stop 238 and a front stop 240 that extend upwardly from the seat 236 at the back and front thereof.

The spring plate 216 is formed of spring steel and is a torsional type of spring having a spring constant determined by its length and width. The spring plate 216 has enlarged opposite ends 242 and 244 that rest directly on a pole of the respective magnets 226 and 228. The magnets 226 and 228 are oriented such that they have like poles adjacent the spring plate. For example, the North poles of the magnet 226 and 228 could be adjacent the spring plate 216 with the South poles of the magnets 226 and 228 adjacent the base 217. Alternatively the South poles of both magnets 226, 228 could be adjacent the spring plate with the North pole of the magnets 226, 228 adjacent the base 217. A narrower arm portion 246, 248 of the spring plate 216 extends from each of the enlarged ends 242, 244 to an enlarged central mirror mounting portion 250 of the spring plate 216. The mirror mounting portion 250 forms the armature of the optical resonant scanner 200 and is mounted directly over the stator posts 218 and 220 such that the axis of rotation 214 of the mirror mounting portion 250 is equidistant from the stator posts 218 and 220. The mirror 212 is mounted on or coated on the mirror mounting portion 250 of the spring plate.

The spring plate 216, magnets 226 and 228 and the base 217 are tightly clamped together by respective spring plate caps 252 and 258, each cap 252, 258 is formed as a block with openings 260 and 262. The openings 260, 262 are formed so that the caps 252, 258 can accommodate the ends 242, 244 of the spring plate, the magnets 226, 228 and the seats 230, 236 as well as the arms 246 and 248 of the spring plate 216 when the caps 252, 258 are resting on the base 217. The cap 252 is held securely to the base 217 by a pair of screws 254 and 256 so as to clamp the spring plate 216 and magnet 226 to the base. The screws 254 and 256 extend up through apertures 258 in the base 217 on opposite sides of the seat 230 and into threaded apertures formed in the cap 252 on opposite sides of the opening 260. The cap 258 is similarly clamped to the base 217 by respective screws 261 and 263 that extend up through respective apertures 264 formed on opposite sides of the cap opening 262.

Magnetic circuits are formed in the optical scanner 200 so as to oscillate the mirror 212 about the axis of rotation 214 in response to an alternating drive signal. One magnetic circuit extends from the top pole of the magnets 226 to the spring plate end 242, through the arms 246 and mirror mounting portion 250 of the spring plate 216, across a gap to the stator 218 and through the base 217 back to the magnet 226 through its bottom pole. Another magnetic circuit extends from the top pole of the magnet 228 to the spring plate end 244 through the arm 248 and mirror mounting portion 250 of the spring plate 216, across a gap to the stator 218 and through the base 217 back to the magnet 228 through its bottom pole. Similarly, magnet circuits are set up through the stator 220 as follows. One magnetic circuit extends from the top pole of the magnet 226 to the spring plate end 242, through the arm 246 and mirror mounting portion of the spring plate 216, across the gap to the stator 220 and through the base 217 back to the magnet 226 through its bottom pole. Another magnetic circuit extends from the top pole of the magnet 228 to the spring plate end 244, through the arm 248 and mirror mounting portion 250 of the spring plate 216, across the gap to the stator 220 and then through the base 217 back to the magnet 228 through its bottom pole.

When a periodic drive signal such as a square wave is applied to the oppositely wound coils 222 and 224, magnetic fields are created which cause the mirror 212 to oscillate back and forth about the axis of rotation 214. More particularly, when the square wave is high for example, the magnetic field set up by the magnetic circuits through the stator 218 and magnets 226 and 228 cause an end 266 of the mirror mounting portion 250 to be attracted to the stator 218. At the same time, the magnetic field created by the magnetic circuits extending through the stator 220 and the magnets 226 and 228 cause the opposite end 268 of the mirror mounting portion 250 to be repulsed by the stator 220. Thus, the mirror is caused to rotate about the axis of rotation in one direction. When the square wave goes low, the magnetic field created by the stator 218 repulses the end 266 of the spring plate 250 whereas the stator 220 attracts the end 268 of the spring plate portion 250 so as to cause the mirror 212 to rotate about the axis 214 in the opposite direction.

In alternative embodiments, the scanning subsystem 14 instead includes acousto-optical deflectors, electro-optical deflectors, rotating polygons or galvanometers to perform the horizontal and vertical light deflection. In some embodiments, two of the same type of scanning device are used. In other embodiments different types of scanning devices are used for the horizontal scanner and the vertical scanner.

Exit Pupil Expanding Apparatus Embodiments

Following are descriptions of four preferred embodiments of the exit pupil expanding apparatus, various alternative embodiments and corresponding methods for forming the exit pupil(s). The preferred embodiments are a diffractive optical element, fiber optic face plate, lens array and a diffuser. In each preferred embodiment the exit pupil expanding apparatus defines a curved entry surface coinciding with the intermediate curved image plane. In various alternative embodiments, light is partially or fully reflected with the resulting reflected light used in defining the exit pupil(s).

Diffractive Optical Element

FIGS. 6a and 6b show the light path through a diffractive optical element 300 embodiment of the exit pupil expanding apparatus 18 of this invention. A diffractive optical element is a device which uses diffraction to control an optical wavefront. Exemplary diffractive optical elements include diffraction gratings, surface-relief diffractive lenses such as Fresnel lenses, holographic optical elements and computer generated holograms. Fabrication techniques include diamond machining, interference of coherent beams (holography), injection molding and microlithographic techniques. In a preferred embodiment a diffraction grating is used.

FIG. 6a shows the light path through a diffraction grating embodiment 300 for scanning a pixel onto the retina of an eye. FIG. 6b shows the light path through the diffraction grating embodiment 300 for scanning another pixel onto the retina of an eye. The diffraction grating 300 has a curved surface 301 which is coincident with the intermediate curved image plane 15. In some embodiments the diffraction grating surface 301 extends beyond the image plane 15.

The diffraction grating 300 receives light 302 from the scanning subsystem 16, then passes a fraction 304 of the incident light 302. One portion 304 is passed in an unchanged direction. Additional portions 306, 308 are deflected at specific angles relative to the incident light 302. The result is multiple beams of light 304–308. The percentage of light in each beam 304–308 is determined by the diffraction pattern. The angles of the exiting light beams 304–308 are defined by grating 300 spacing and the light wavelengths. Each of the multiple beams 304–308 is an expanding beam which passes through the eyepiece 20 to define a separate exit pupil 310, 312, 314 at a known distance d from the eyepiece 20. The viewer positions their eye pupil at the distance d from the eyepiece 20. In effect multiple closely spaced exit pupils 310–314 are defined beyond the eyepiece 20. When the viewer's eye E is in position, one or more exit pupils 310–314 are formed at the viewer's eye pupil.

In an exemplary embodiment a 2-dimensional array of 7×7 exit pupils are defined at the distance d. Each exit pupil is approximately 1.5 mm in diameter. A spacing of approximately 1 mm occurs between each exit pupil. Depending on the ambient lighting, the eye pupil spans a diameter of approximately 2 to 7 mm. Thus, between 1 and approximately 9 exit pupils occur at the pupil of the viewer's eye E.

In a given dimension, between 1 and 3 exit pupils occur at the eye pupil. More significantly, there are between 4 and 6 more exit pupils occurring along a given direction outside the eye pupil. Thus, if a viewer moves their eye, they will move into alignment with one or more of such other exit pupils. From a centered position, a viewer would need to move by 2 or 3 exit pupils (e.g., 5 to 7.5 mm) before losing alignment with all retinal display exit pupils. This corresponds a substantially increased freedom of movement for the viewer. More specifically, given the conventional single exit pupil of 1.5 mm centered at an eye pupil of 2 mm in diameter, a viewer loses alignment by moving approximately 1 mm. Given a centered 7×7 array of exit pupils according to this invention, the viewer would need to move 5 to 7.5 mm to lose alignment. Further, by forming multiple exit pupils 308, the average brightness of the exit pupils 308 formed at the viewer's eye stays approximately the same when the viewer movers their eye to align with other exit pupils 308.

Although a 7×7 array of exit pupils is described in which each exit pupil is 1.5 mm in diameter and spaced 1 mm apart, arrays of different size and exit pupils of different diameter and spacing are used in alternative embodiments. In one embodiment the exit pupil has a diameter within a range of 2 mm to less than 1 mm. In other embodiments larger exit pupils are formed having a diameter larger than 2 mm (e.g., 4 mm diameter or larger).

Referring to FIG. 6a light from each exit pupil 310–314 aligned with the eye E enters the eye at a common angle qA. As a result the light from each exit pupil 310–312 focuses at the same point 316 on the retina 315. This point corresponds to one pixel of the image being scanned. In comparison, in FIG. 6b light from each exit pupil 310', 312' also enters at a common angle qβ. Such angle qβ, however, differs from the angle qA in FIG. 6a. The different incidence angle causes light to focus at a different point 318 on the retina 315. This point 318 corresponds to a different pixel of the image being scanned. As the scanning subsystem 16 deflects the light 302 the focal point on the image plane 15 moves. As the light 302 scans the image plane 15, the exit pupils 310–314 define light impinging the eye pupil at changing angles. Thus, the point where the light strikes the retina changes. Over the scanning cycle the light scans many points or pixels directly onto the retina 315.

Fiber Optic Face Plate

Figure 7:
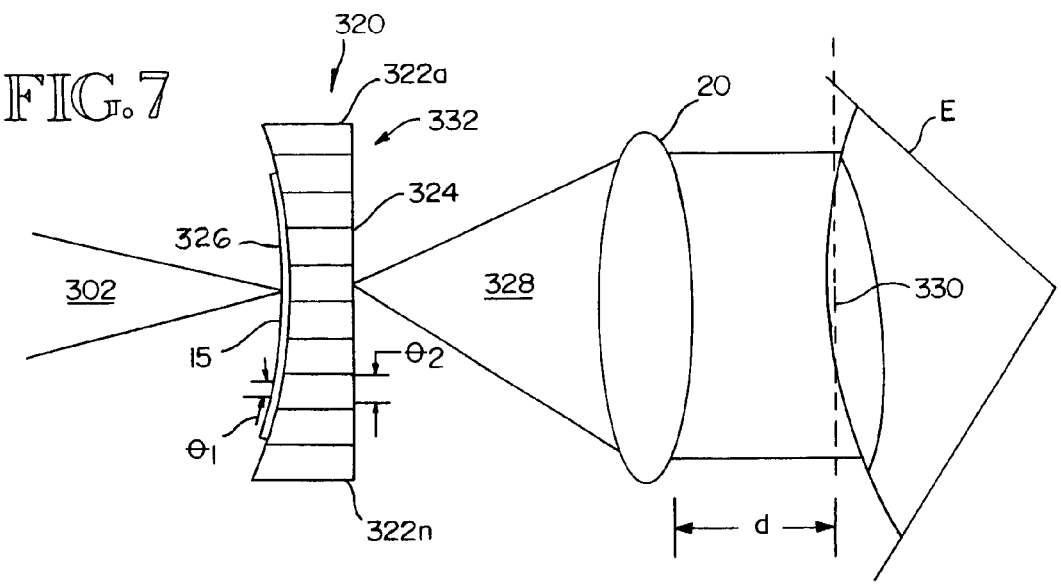
FIG. 7 is an optical diagram of the exit pupil expanding apparatus according to another embodiment of this invention.

FIG. 7 shows the light path through a fiber optic face plate 320 embodiment of the exit pupil expanding apparatus 18. The fiber optic face plate 320 is formed by a bundle of aligned optical fibers 322a–322n. One end 324 of each fiber 322i defines a portion of a curved plane 326 receiving incident light 302 from the scanning subsystem 16. The curved plane 326 is coincident with the intermediate curved image plane 15. Light 302 impinges upon the face plate 320 at surface 326. As the scanning subsystem 16 deflects the light in a raster pattern an image plane 15 forms at the surface 326. For each discrete deflection of light a pixel is defined. FIG. 7 shows the light 302 focussing at one point (i.e., pixel) of the image plane 15.

Light 302 enters a fiber 322i over a given narrow angle q1, then exits over an enlarged angle q2. In some embodiments the fiber approximates a Lambertian source. The enlarged angle causes a larger surface of the eyepiece to receive light 328. In turn the eyepiece creates a larger exit pupil 330 at the eye pupil. For each pixel imaged on the retina there is the same enlarged exit pupil. Note that for each pixel scanned, the light defining the exit pupil impinges on the eye pupil at a different angle. Thus, the light entering the eye is focused at differing points as the subsystem deflects the light 302 along a raster pattern. The differing points are, in effect, pixels of an image being scanned onto the retina.

In one embodiment the fiber bundle 320 defines a diameter of 2–5 cm. Each fiber 322i defines a diameter of approximately 5 microns and a length of approximately 3 mm. The specific dimensions of each fiber 322i, however may vary. According to variations, to best match the geometry of the eyepiece 20 the fiber bundle 320 defines at its exit surface 332, either one of a flat planar surface or curved planar surface.

Lens Array

Figure 8:
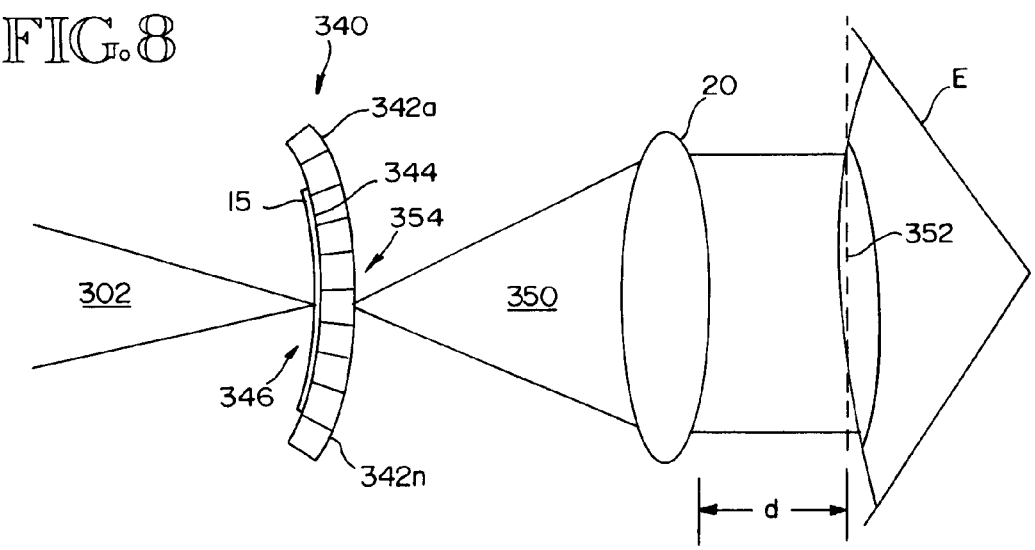
FIG. 8 is an optical diagram of the exit pupil expanding apparatus according to another embodiment of this invention.

FIG. 8 shows the light path through a lens array 340 embodiment of the exit pupil expanding apparatus 18. The array 340 includes several small lenses 342a–342n. Each lens 342i is on the order of 5–100 microns in diameter. In a preferred embodiment lenses 342i having a diameter of approximately 10 microns are used. Each lens 342i is spaced as closely as possible to each adjacent lens 342(i+1), 342(i−1) in the array 340. In one embodiment the lens array 340 defines a diameter of 2–5 cm. The side 344 of each lens 342i facing the scanning subsystem 16 defines a curved plane 346. The cumulative plane 346 of the lenses coincides with the image plane 15 scanned by the scanning subsystem 15. In alternative embodiments the lens array 340 is defined as a holographic optical element.

Light 302 enters a lens 342i over a given narrow angle q3, then exits over an enlarged angle q4. The enlarged angle q4 causes a larger surface of the eyepiece 20 to receive light 350. In turn the eyepiece creates a larger exit pupil 352 at the eye pupil. For each pixel imaged on the retina there is the same enlarged exit pupil. Note that for each pixel scanned, the light defining the exit pupil impinges on the eye pupil at a different angle. Thus, the light entering the eye is focused at differing points as the subsystem deflects the light 302 along a raster pattern. The differing points are, in effect, pixels of an image being scanned onto the retina.

Diffuser

Figure 9:
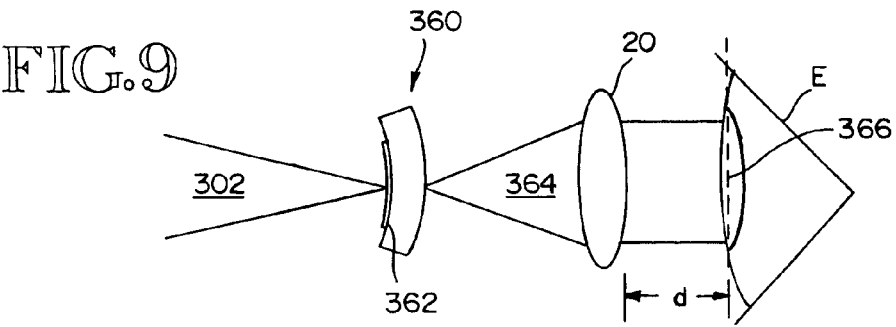
FIG. 9 is an optical diagram of the exit pupil expanding apparatus according to another embodiment of this invention.

FIG. 9 shows the light path through a diffuser 360 embodiment of the exit pupil expanding apparatus 18. The diffuser 360 receives the light 302 from the scanning subsystem 16. The intermediate curved image plane 15 scanned by the scanning subsystem 16 coincides with a curved surface 362 of the diffuser. In one embodiment the diffuser 360 is engineered to evenly spread the passing light. In alternative embodiments the diffuser 360 is a reflective diffuser or is defined as a holographic optical element or a holographic random phase element.

The light 364 output from the diffuser 360 is an expanding beam which passes through the eyepiece 20 to define an expanded exit pupil 366 at a position where the viewer is to place their eye E. Note that for a given pixel of the image plane 15, the angle of light 364 exiting the diffuser is larger than the angle at which light 302 enters the diffuser. As a result, a larger portion of the eyepiece 20 receives light 364. In turn a larger exit pupil (i.e., larger diameter) occurs at a distance d beyond the eyepiece 20. For each pixel scanned, the light defining the exit pupil impinges on the eye pupil at a different angle. Thus, the light entering the eye is focused at differing points as the subsystem deflects the light 302 along a raster pattern. The differing points are, in effect, pixels of an image being scanned onto the retina.

Eyepiece

The eyepiece 20 typically is a multi-element lens or lens system receiving the light beam(s) exiting from the exit pupil enlarging apparatus 18. In an alternative embodiment the eyepiece 20 is a single lens. The eyepiece 20 serves to relay the rays from the light beam(s) toward a viewer's eye. In particular the eyepiece 20 contributes to the location where an exit pupil of the retinal display 10 forms. The eyepiece 20 defines one or more exit pupils at a known distance d from the eyepiece 20 as shown in FIGS. 2 and 6–9. Such location is the expected location for a viewer's eye E. As a result, one or more exit pupils are formed coincident with a viewer's eye, the eye being positioned adjacent to the eyepiece.

In one embodiment the eyepiece 20 is an occluding element which does not transmit light from outside the display device 10. In an alternative embodiment, an eyepiece lens system 20 is transmissive so as to allow a viewer to view the real world in addition to the virtual image. In yet another embodiment the eyepiece is variably transmissive to maintain contrast between the real world ambient lighting and the virtual image lighting. For example a photosensor detects ambient lighting. A bias voltage is generated which applies a voltage across a photochromatic material to change the transmissiveness of the eyepiece 20.

Alternative Embodiments

The components of the retinal display 10 can be made small, compact and lightweight so as to embody a hand-held display or to be mounted on a viewer's head without requiring a helmet or an elaborate head mounting support. Also the light source 12 and image data interface 11 can be separated from the rest of the display 10 to further reduce the volume and weight of the display portion adjacent to the viewer' eye. For example the modulating light emitted from the light source 12 is coupled to the optical subsystem 14 in an alternative embodiment via one or a bundle of monofilament optical fibers.

For a display device providing stereoscopic viewing two retinal display devices 10 are used. If combining two monocular systems to define binocular viewing, however, there is a potential conflict between distance cues and focus.

Meritorious and Advantageous Effects

One advantage of this invention is that the shorter light path allows for a more compact, lighter weight retinal display device. Another advantage is that a viewer has less difficulty aligning and maintaining alignment with an exit pupil formed at the eyepiece. In particular, the expanded exit pupil, the multiple exit pupils or the multiple, expanded exit pupils make it easier for a viewer to find an exit pupil. Another advantage with regard to the diffractive optical element embodiment is that image brightness is generally uniform among various groups of exit pupils which form at the viewer's eye.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A scanning display, comprising:

a scanning source operative to output a beam of light at a series of different scanned angles along an intermediate curved image plane;

an exit pupil expander having a curved surface coincident wih the intermediate curved image plane, and including a plurality of input locations along the curved surface, the beam expander being positioned to receive the beam of light at a respective one of the input locations for each of the different scanned angles, the beam expander being configured at each of the locations to redirect portions of the received beam from each of the scanned angles to a respective set of discrete output angles as an expanding beam, wherein the set of output angles for each of the scanned angles includes a plurality of discrete output angles, each discrete output angle being a function of the respective scanned angle.

2. The display of claim 1, further comprising:

imaging optics positioned to receive substantially all of the portions of the beam of light from the exit pupil expander, the imaging optics forming a plurality of discrete exit pupils from the received portions, each exit pupil including light received from substantially all of the sets of output angles.

3. The display of claim 2, wherein the scanning source, exit pupil expander and imaging optics are sized and relatively positioned for mounting relative to a viewer's eye.

4. The display of claim 1, in which the scanning source outputs a beam of colored light.

5. The display of claim 4, wherein the scanning source is operative to output a beam of light at a series of different scanned angles occurring in a raster pattern.

6. A method of producing a plurality of virtual images perceivable by a viewer, comprising the steps of:

modulating a beam of light with image information;

scanning the beam of light through a pattern forming an intermediate curved image plane;

receiving the scanned beam at a diffractor grating having a curved surface coincident with the intermediate curved image plane;

dividing the scanned beam of light with the diffractor grating into a plurality of sub-beams; and for each position in the pattern, expanding each of the sub-beams for viewing by the viewer.

7. The method of claim 6, in which the beam of light is colored light.

8. The method of claim 6, in which the pattern is a raster pattern.

9. The method of claim 6, in which the step of shaping each of the sub-beams comprises forming a respective exit pupil for each one of a plurality of said sub-beams.

* * * * *